(12) United States Patent
Huang et al.

(10) Patent No.: US 7,052,521 B2
(45) Date of Patent: May 30, 2006

(54) DYE COMPOSITION AND THE USE THEREOF

(75) Inventors: Huei-Chin Huang, Taoyuan (TW); Sheue-Rong Lee, Bade (TW); Hsiao-San Chen, Lujhu (TW)

(73) Assignee: Everlight USA, Inc., Pineville, NC (US)

( * ) Notice: Subject to any disclaimer, the term of this patent is extended or adjusted under 35 U.S.C. 154(b) by 175 days.

(21) Appl. No.: 10/874,275

(22) Filed: Jun. 24, 2004

(65) Prior Publication Data

US 2005/0183217 A1    Aug. 25, 2005

(30) Foreign Application Priority Data

Feb. 25, 2004 (CN) .................. 2004 1 0066575

(51) Int. Cl.
*D06P 3/10* (2006.01)
*D06P 3/66* (2006.01)
*C09B 67/24* (2006.01)

(52) U.S. Cl. .................. 8/549; 8/641; 8/918; 8/924
(58) Field of Classification Search ............ None
See application file for complete search history.

(56) References Cited

U.S. PATENT DOCUMENTS

| 5,308,362 | A | * | 5/1994 | Kayane et al. | 8/641 |
| 6,036,732 | A | * | 3/2000 | Pedemonte et al. | 8/549 |
| 6,171,349 | B1 | * | 1/2001 | Lai et al. | 8/549 |
| 6,464,734 | B1 | * | 10/2002 | Steckelberg et al. | 8/549 |

FOREIGN PATENT DOCUMENTS

TW            56934      * 8/1982

* cited by examiner

*Primary Examiner*—Margaret Einsmann
(74) *Attorney, Agent, or Firm*—Bacon & Thomas

(57) ABSTRACT

A dye composition, which comprising: a monoazo dye of the formula

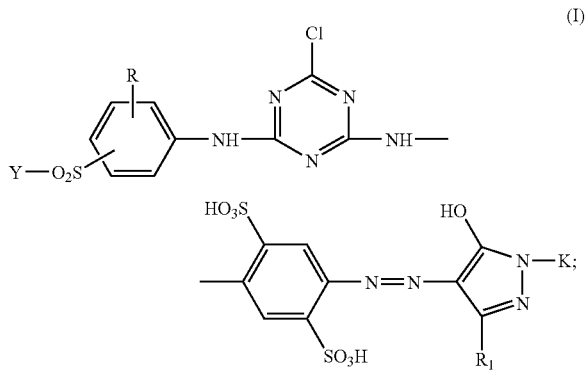

(I)

and a disazo dye of the formula (II)

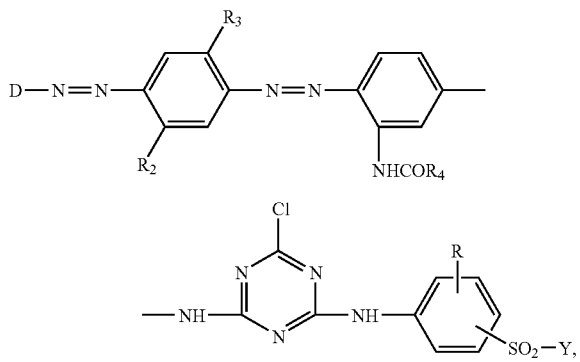

wherein R, $R_1$, $R_2$, $R_3$, $R_4$, Y, K, D are defined in this document ; these kinds of dye composition have good stability and build-up. The dye composition are suitable for dyeing and printing of materials containing cellulose fibers, such as cotton, artificial cotton, linen, and artificial linen, or synthetic polyamide, such as wool, silk, and nylon etc.

22 Claims, No Drawings

DYE COMPOSITION AND THE USE THEREOF

BACKGROUND OF THE INVENTION

1. Field of the Invention

The present invention relates to dye compositions and the use thereof, more particularly to yellow reactive dye compositions and the use thereof.

2. Description of Related Art

The reactive dyestuffs are used for dyeing or printing cellulose fibers or cellulose containing fibers particularly need high quality such as the properties of leveling, reproducibility, solubility, fastness etc.

However, the reactive dyestuffs available presently are short of a golden-yellow dye characterized with ordinary build-up and light fastness. These shortcomings exposed and can not be conquered while dyeing with pale shade and trichromatic combination. Taking the yellow dyestuffs for example, it is known that pyrazoline azo dyestuff is excellent in various fastness properties, especially light fastness. However, pyrazoline azo dyestuff is lack for build-up and colour combination for it's pale shade, therefore, the conventional dyestuff shows limited colour gamut while dyeing application.

The dye compositions of the present invention include pyrazoline azo dyestuffs and disazo dyestuffs are the dye compositions with good light fastness and build-up. They are not only have superior characteristics of fastness properties, the dye compositions of the present invention are also economic in dyeing with a broad colour gamut.

SUMMARY OF THE INVENTION

The present invention provides a dye composition, which has good dyeing properties such as light fastness and build-up. The dye compositions of the present invention are economic in dyeing pale shade and achieving various fastness properties as well. The dye compositions of the present invention can be mixed with conventional dyestuffs to overcome the drawbacks of phototropic property and the limited colour gamut.

The dye composition of the present invention includes: a monoazo dye of the formula (I):

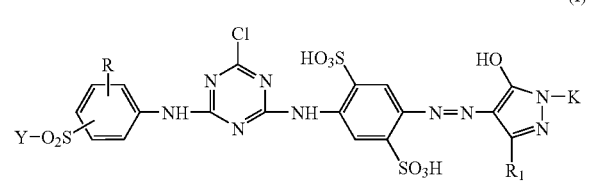

(I)

wherein R is hydrogen, sulfo, $C_{1-4}$ alkyl or $C_{1-4}$ alkoxyl; $R_1$ is $-CH_3$ or $-COOH$; K is phenyl or naphthyl rings having 0 to 3 substituent groups, said substituent groups are selected from the groups consisting of halogen, $C_{1-4}$ alkyl, $C_{1-4}$ alkoxyl, nitro, amino, hydroxyl, carboxyl, phosphonic acid and sulfo group; Y is $-CH=CH_2$, $-CH_2CH_2Cl$ or $-CH_2CH_2OSO_3H$; and a disazo dye of the formula (II):

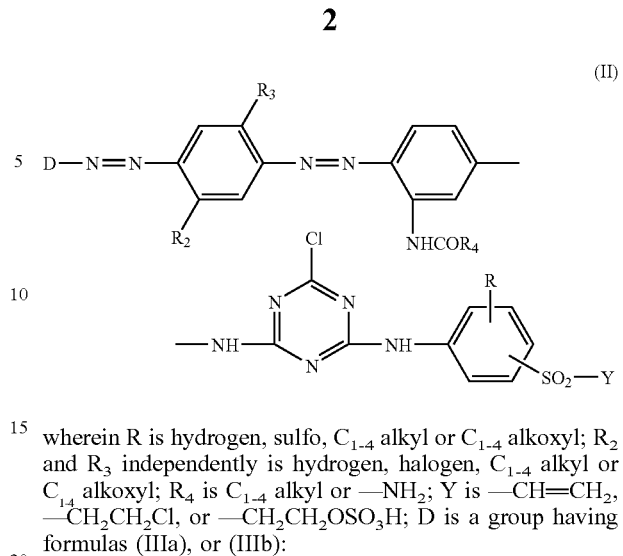

(II)

wherein R is hydrogen, sulfo, $C_{1-4}$ alkyl or $C_{1-4}$ alkoxyl; $R_2$ and $R_3$ independently is hydrogen, halogen, $C_{1-4}$ alkyl or $C_{1-4}$ alkoxyl; $R_4$ is $C_{1-4}$ alkyl or $-NH_2$; Y is $-CH=CH_2$, $-CH_2CH_2Cl$, or $-CH_2CH_2OSO_3H$; D is a group having formulas (IIIa), or (IIIb):

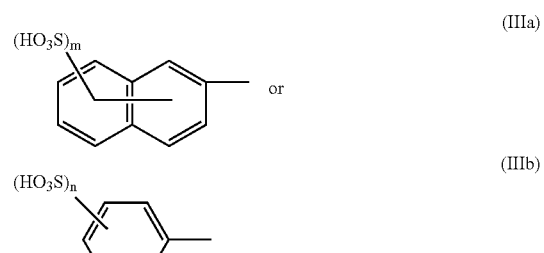

wherein m is an integer of 1, 2 or 3; n is an integer of 1 or 2.

The dye compositions of the present invention are suitable for dyeing materials that contain either cellulose fibers, such as cotton, artificial cotton, linen, and artificial linen, or synthetic polyamide, such as wool, silk, and nylon. Dyeing materials with dye compositions above-mentioned will achieve excellent properties, especially in build-up and light fastness.

Other objects, advantages, and novel features of the invention will become more apparent from the following detailed description.

DETAILED DESCRIPTION OF THE PREFERRED EMBODIMENT

The preparation of the compound of formula (I) is described in Taiwan Patent No. 56934.

Preferably the compound of formula (I) is the monoazo dye of formula (Ia):

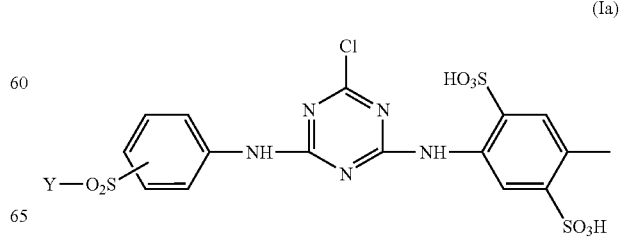

(Ia)

-continued

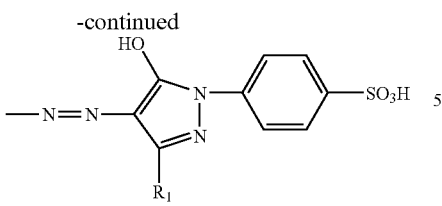

wherein $R_1$ is —$CH_3$ or —COOH; Y is —CH=$CH_2$, —$CH_2CH_2Cl$ or —$CH_2CH_2OSO_3H$.

More preferably, it is the monoazo dye of formula (Ib):

(Ib)

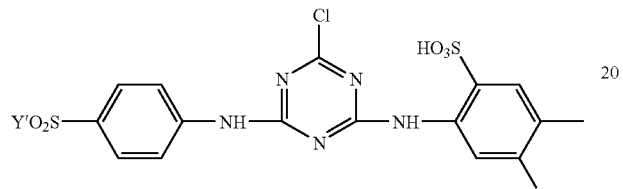

wherein Y' is —CH=$CH_2$ or —$CH_2CH_2OSO_3H$.

Most preferably it is the monoazo dye of formula (I-1):

-continued

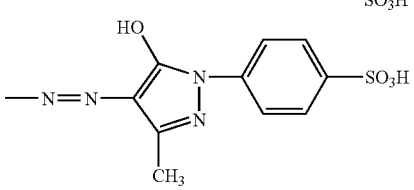

wherein $R_2$ and $R_3$ independently is hydrogen, halogen, $C_{1-4}$ alkyl or $C_{1-4}$ alkoxyl; Y is —CH=$CH_2$, —$CH_2CH_2Cl$, or —$CH_2CH_2OSO_3H$; D is a group having to the formulas:

(IIIa)

(HO$_3$S)$_m$ or (IIIb)

(HO$_3$S)$_n$ wherein m is an integer of 1, 2 or 3; n is an integer of 1 or 2.

(I-1)

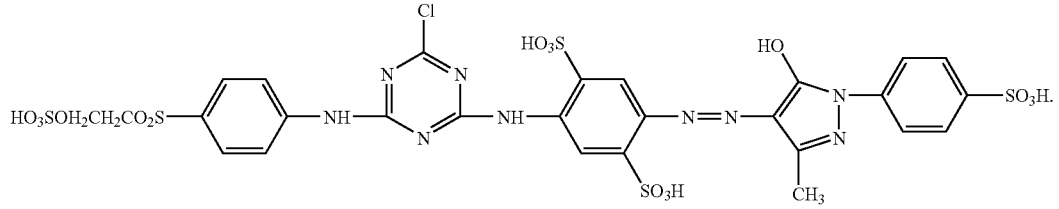

The synthesis of formula (II) may refer to DE Patent No. 3,603,101. Preferably the compound of formula (II) is the disazo dye of formula (IIa):

(IIa)

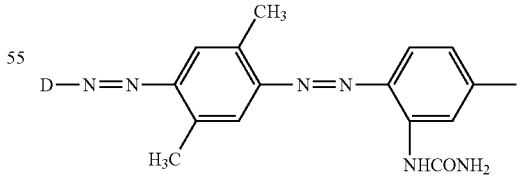

More preferably it is the disazo dye of formula (IIb):

(IIb)

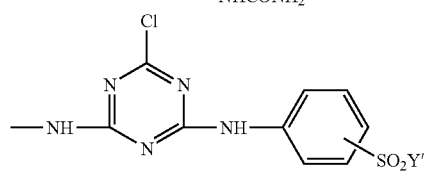

Y' is —CH=CH₂ or —CH₂CH₂OSO₃H; D is a group having formulas (IIIa) or (IIIb):

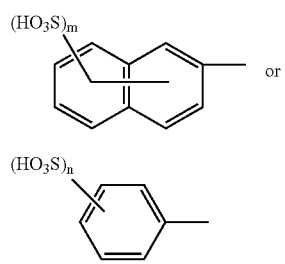

(IIIa)

or (IIIb)

wherein m is an integer of 1, 2 or 3; n is an integer of 1 or 2.

Most preferably it is the disazo dye of formulas (II-1) and (II-2):

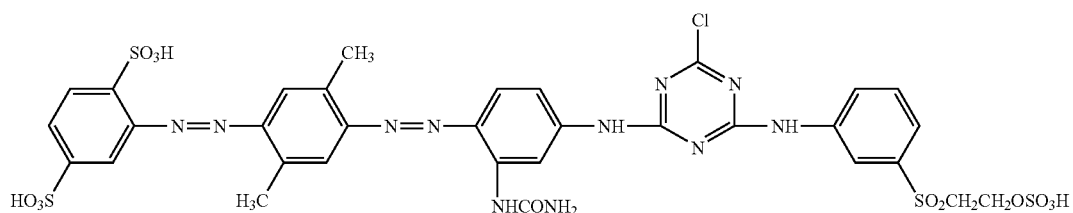

(II-1)

and

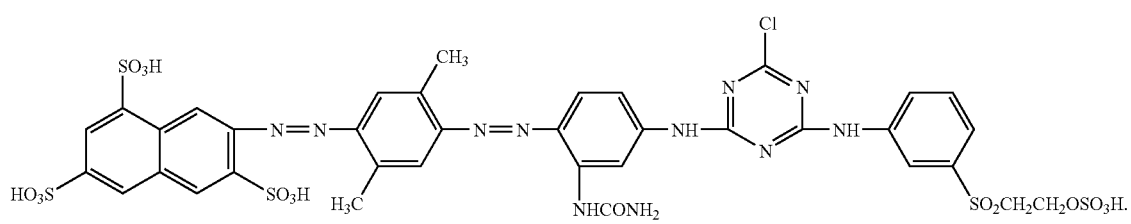

(II-2)

With the total weight of the dye compositions of the present invention, weight percentage of the formula (I) ranges are not limited, preferably the formula (I) is present in an amount ranging from 50% to 99% by weight relative to total weight of the composition, and the formula (II) is present in an amount ranging from 1% to 50% by weight relative to total weight of the composition. More preferably the formula (I) is present in an amount ranging from 60% to 90% by weight relative to total weight of the composition, and the formula (II) is present in an amount ranging from 10% to 40% by weight relative to total weight of the composition.

The composition of the present invention can be prepared in many ways. For example, by using separately prepared dye components mixing each dye together or by mixing one component alone then with another component. The way of mixing is by using a proper mixer, for example, a ball and sand grinder. In the same way, individual dye with different components can make dye liquid through stirring, or through control of conditions in each dye preparation to produce an ideal mixture. In the process of dyeing or printing, separate dyes can be mixed together or mixed with other dyes.

If necessary, the dye compositions of the present invention may be contained with inorganic salts (e.g. sodium sulfate or sodium chloride), dispersants (e.g. β-naphthalene sulfonic acid-formaldehyde condensation products, methyl naphthalene sulfonic acid-formaldehyde condensation products, acetyl amino naphthol based compounds, etc.), non-dusting agents (e.g. di-2-ethylhexyl terephthalate, etc.), pH buffer agents (e.g. sodium acetate, sodium phosphate, etc.), water softeners (e.g. polyphosphate, etc.), well-known dyeing assistants, and etc.

The form of the dye compositions of the present invention is not necessary to limitation. The dye compositions of the present invention can be in the form of powders, granules or liquids.

For convenience in the statement, the compounds are expressed as free acid in the specification. When the dyestuffs of the present invention are manufactured, purified or used, they often exist in the form of water soluble salts, especially alkaline metallic salts, such as sodium salts, lithium salts, potassium salts or ammonium salts, and preferably sodium salts.

The dye compositions of the present invention can dye many kinds of fiber materials such as cellulose fiber materials and cellulose included fiber materials. These dye compositions can also be used to dye natural cellulose fibers and regenerated cellulose fibers, such as cotton, linen, jute, ramie, mucilage rayon, as well as cellulose based fibers.

The dyeing or printing of the reactive dye composition can be preceded by usual or known method. Exhaustion dyeing is applied by using usual inorganic salts (e.g. sodium sulfate and sodium chloride) and well-known acid-binding agents (e.g. sodium carbonate, sodium hydroxide). The amount of inorganic salts and alkali here is not important. Inorganic salts and alkali can be added into the dyeing bath through traditional methods either by once or by several times. In addition, dyeing assistants can be added, too. The range of dyeing temperature is from 40° C. to 90° C. Preferably, the temperature for dyeing is from 50° C. to 70° C.

In a cold-pad-batch application, dye, alkali and customary auxiliaries are padded from the liquor through. The padded, squeezed substrate is often rolled onto an A-frame and batched at room temperature to allow dye fixation to take place.

In a continuous dyeing, it can be divided into two different methods. In the one-bath padding application, dye, alkali (e.g. sodium carbonate or sodium bicarbonate) and customary auxiliaries are padded from the liquor through, the padded, squeezed substrate was then dried by either baking or steam. In the two bath padding application, the substrate is padded through a dye solution bath, pre-dried, an alkali (e.g. sodium hydroxide or sodium silicate) bath, then dye fixed by either baking or steam.

In textile printing, there can be exemplified a method which conducts printing a substrate with a printing paste containing, a well-known acid-binding agent (e.g. sodium bicarbonate), thickener, and completing the dye fixation by dry heat or steam. The dyeing or printing methods employed in the process of the present invention are not limited to these methods.

The reactive dye composition of the present invention has good dyeing properties such as build-up, reproducibility and levelness for printing and dyeing.

The dye compositions of the present invention exhibit a wide range of colours and increase the dye affinity to cellulose fiber materials while dyeing or printing, and can be used in both acid or base dyeing environments. Besides, the dyed cellulose fiber materials have excellent properties of light fastness, wet-light fastness, and wet fastness, e.g. wash fastness, water fastness, seawater fastness, cross-dyeing fastness, and perspiration fastness, as well as pleating fastness, ironing fastness, and rubbing fastness. Therefore, the present invention is a valuable reactive yellow dye for cellulose fibers in the present dyeing industry. The dye compositions have the materials dyed with excellent properties and resulting outstanding build-up and light fastness. Owing to the change of the demand of the market, the general reactive dyestuff will not meet the requirements of the extremely pale shade and mixture market any more. The dye compositions of the present invention exhibit better light fastness in pale shade, and particularly in mixture of extremely pale shade, thereby allowing this invention to fit in with the requirements and expectations of market.

Many examples have been used to illustrate the present invention. The examples sited below should not be taken as a limit to the scope of the invention. In these examples, the compounds are represented in the form of dissolved acid. However, in practice, they will exist as alkali salts for mixing and salts for dyeing.

In the following examples, quantities are given as parts by weight (%) if there is no indication. The relationship between weight parts and volume parts are the same as that between kilogram and liter.

EXAMPLE 1

Preparing dyestuffs of formula (I-1) and formula (II-1) as described above. Take 90 weight parts of formula (I-1) and 10 weight parts of formula (II-1) and mixed completely to form a dye composition.

EXAMPLE 2

Preparing dyestuffs of formula (I-1) and formula (II-1) as described above. Take 75 weight parts of formula (I-1) and 25 weight parts of formula (II-1) and mixed completely to form a dye composition.

EXAMPLE 3

Preparing dyestuffs of formula (I-1) and formula (II-1) as described above. Take 60 weight parts of formula (I-1) and 40 weight parts of formula (II-1) and mixed completely to form a dye composition.

EXAMPLE 4

Preparing dyestuffs of formula (I-1) and formula (II-2) as described above. Take 90 weight parts of formula (I-1) and 10 weight parts of formula (II-2) and mixed completely to form a dye composition.

EXAMPLE 5

Preparing dyestuffs of formula (I-1) and formula (II-2) as described above. Take 75 weight parts of formula (I-1) and 25 weight parts of formula (II-1) and mixed completely to form a dye composition.

EXAMPLE 6

Preparing dyestuffs of formula (I-1) and formula (II-2) as described above. Take 60 weight parts of formula (I-1) and 40 weight parts of formula (II-1) and mixed completely to form a dye composition.

EXAMPLE 7

Preparing dyestuffs of formula (I-1) as described above and formula (II-3) as described below. Take 90 weight parts of formula (I-1) and 10 weight parts of formula (II-3) and mixed completely to form a dye composition.

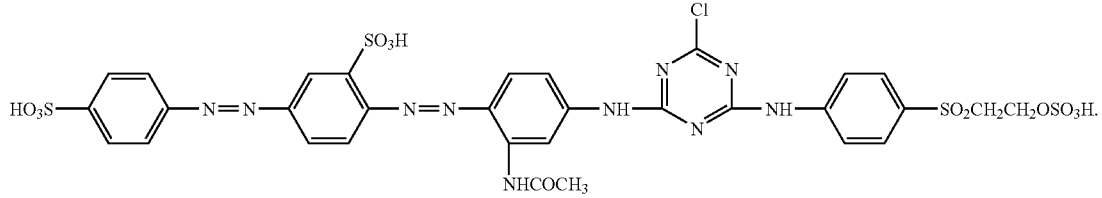

(II-3)

EXAMPLE 8

Preparing dyestuffs of formula (I-1) and formula (II-3) as described above. Take 75 weight parts of formula (I-1) and 25 weight parts of formula (II-3) and mixed completely to form a dye composition.

EXAMPLE 9

Preparing dyestuffs of formula (I-1) and formula (II-3) as described above. Take 60 weight parts of formula (I-1) and 40 weight parts of formula (II-3) and mixed completely to form a dye composition.

EXAMPLE 10

Preparing dyestuffs of formula (I-1) as described above and formula (II-4) as described below. Take 90 weight parts of formula (I-1) and 10 weight parts of formula (II-4) and mixed completely to form a dye composition.

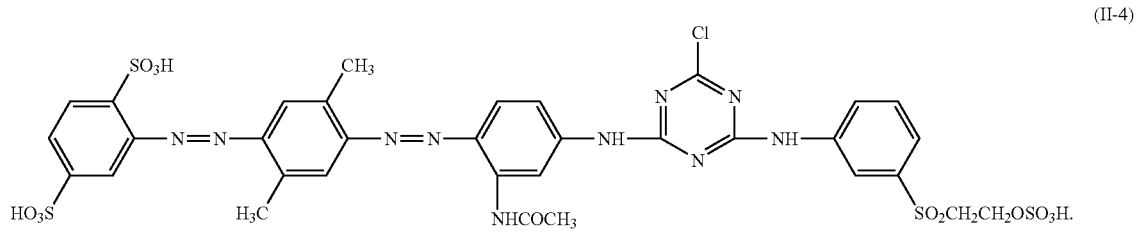

(II-4)

EXAMPLE 11

Preparing dyestuffs of formula (I-1) and formula (II-4) as described above. Take 75 weight parts of formula (I-1) and 25 weight parts of formula (II-4) and mixed completely to form a dye composition.

EXAMPLE 12

Preparing dyestuffs of formula (I-1) and formula (II-4) as described above. Take 60 weight parts of formula (I-1) and 40 weight parts of formula (II-4) and mixed completely to form a dye composition.

COMPARATIVE EXAMPLE 1

Compare the dyeing properties of the dye compositions of the present invention with 100% dyestuffs of formula (I-1) with the following structure:

Various tests were taken following the procedures describe below.

TEST EXAMPLE 1

Build-up Testing by Exhaustion Dyeing

Each dye composition of Comparative example 1 and Example 1–3 were tested by K/S test to evaluate single colour build-up. The detailed description is as follows.

First, five dye liquors were prepared, wherein each 80 ml liquor respectively had a concentration of 1.0%, 2.0%, 4.0%, 6.0% and 9.0% on the weight of the fabric (o.w.f). After that, inorganic neutral salt was added, and then dyeing of the un-mercerized cloths made of pure cotton was started. The un-mercerized cotton cloths were soaked in the dye liquors. At the same time, dyeing of the dyestuffs was started at 60° C. and then the dyestuffs started diffusing to adhere the cloths with the aid of a horizontal shaker, which is followed by adding an alkali agent that made the dyestuffs react with fiber completely to achieve firm adherence. The resulting dyed cloths were water cleaned, soaping off, and tumble-dried to form finished products.

The results of build-up testing by exhaustion dyeing are summarized in table 1 below.

TABLE 1

| | Concentration of dye liquors (o.w.f) | | | | |
|---|---|---|---|---|---|
| Σ K/S value | 1.0% | 2.0% | 4.0% | 6.0% | 9.0% |
| Comparative example 1 | 3.94 | 6.42 | 9.12 | 10.76 | 13.09 |
| example 1 | 4.71 | 7.75 | 12.1 | 14.73 | 17.35 |
| example 2 | 6.05 | 9.7 | 13.59 | 16.03 | 17.98 |
| example 3 | 5.58 | 9.1 | 12.37 | 13.95 | 16.99 |

K/S is "kubelka coefficient"; it gets better build-up when the value of Σ K/S gets higher.

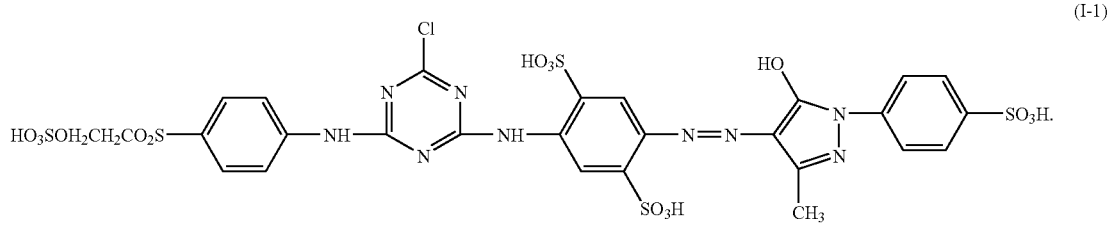

(I-1)

According to table 1, different dye compositions of example 1 to example 3 in the present invention showed higher ΣK/S values than that of reactive dyestuff formula (I-1) of comparative example 1. Take concentration 9% o.w.f. of dye liquors for example, the ΣK/S values of example 1, 2 and 3 were 17.35, 17.98, 16.99, separately; on the other hand, the ΣK/S value of reactive dyestuff formula (I-1) of comparative example 1 was 13.09. The data indicate the build-up of example 1 to example 3 within different dye compositions in the present invention are more outstanding than that of comparative example 1 with simply 100% reactive dyestuff formula (I-1).

TEST EXAMPLE 2

Build-up Testing by Exhaustion Dyeing

Each dye composition of Comparative example 1 and Example 4–6 were tested by K/S test to evaluate single colour build-up. The detailed description is as the following.

First, five dye liquors were prepared, wherein each 80 ml liquor respectively had a concentration of 1.0%, 2.0%, 4.0%, 6.0% and 9.0% on the weight of the fabric (o.w.f). After that, inorganic neutral salt was added, and then dyeing of the un-mercerized cloths made of pure cotton was started. The un-mercerized cotton cloths were soaked in the dye liquors. At the same time, dyeing of the dyestuffs was started at 60° C. and then the dyestuffs started diffusing to adhere the cloths with the aid of a horizontal shaker, which is followed by adding an alkali agent that made the dyestuffs react with fiber completely to achieve firm adherence. The resulting dyed cloths were water cleaned, soaping off, and tumble-dried to form finished products.

The results of build-up testing by exhaustion dyeing are summarized in table 2 below.

TABLE 2

| Σ K/S value | Concentration of dye liquors (o.w.f) | | | | |
|---|---|---|---|---|---|
| | 1.0% | 2.0% | 4.0% | 6.0% | 9.0% |
| Comparative example 1 | 3.94 | 6.42 | 9.12 | 10.76 | 13.09 |
| example 4 | 4.60 | 7.98 | 11.81 | 14.74 | 17.22 |
| example 5 | 5.58 | 9.12 | 12.89 | 16.29 | 19.07 |
| example 6 | 6.63 | 10.41 | 15.10 | 17.31 | 20.27 |

K/S is "kubelka coefficient"; it gets better build-up when the Σ K/S value higher.

Based on table 2, different dye compositions of example 4 to example 6 showed higher ΣK/S values than that of comparative example 1 within reactive dyestuff of formula (I-1). Take concentration 9% o.w.f. of dye liquors for example, the ΣK/S values of example 4, 5 and 6 were 17.22, 19.07, 20.27, separately; on the contrary, the ΣK/S value of reactive dyestuff formula (I-1) of comparative example 1 was 13.09. The data indicate the build-up of example 4 to example 6 within different dye compositions in the present invention are more outstanding than that of comparative example 1 with simply 100% reactive dyestuff formula (I-1).

TEST EXAMPLE 3

Build-up Testing by Exhaustion Dyeing

Each dye composition of Comparative example 1 and Example 7–9 were tested by K/S test to evaluate single colour build-up. The detailed description is as the following.

First, five dye liquors were prepared, wherein each 80 ml liquor respectively had a concentration of 1.0%, 2.0%, 4.0%, 6.0% and 9.0% on the weight of the fabric (o.w.f). After that, inorganic neutral salt was added, and then dyeing of the un-mercerized cloths made of pure cotton was started. The un-mercerized cotton cloths were soaked in the dye liquors. At the same time, dyeing of the dyestuffs was started at 60° C. and then the dyestuffs started diffusing to adhere the cloths with the aid of a horizontal shaker, which is followed by adding an alkali agent that made the dyestuffs react with fiber completely to achieve firm adherence. The resulting dyed cloths were water cleaned, soaping off, and tumble-dried to form finished products.

The results of build-up testing by exhaustion dyeing are summarized in table 3 below.

TABLE 3

| Σ K/S value | Concentration of dye liquors (o.w.f) | | | | |
|---|---|---|---|---|---|
| | 1.0% | 2.0% | 4.0% | 6.0% | 9.0% |
| Comparative example 1 | 3.94 | 6.42 | 9.12 | 10.76 | 13.09 |
| example 7 | 4.03 | 6.34 | 9.74 | 12.07 | 14.96 |
| example 8 | 4.76 | 7.46 | 11.42 | 13.16 | 15.47 |
| example 9 | 4.98 | 7.66 | 11.79 | 13.59 | 16.58 |

K/S is "kubelka coefficient"; it gets better build-up when the value of Σ K/S gets higher.

According to table 3, different dye compositions of example 7 to example 9 in the present invention showed higher ΣK/S values than that of reactive dyestuff formula (I-1) of comparative example 1. Take concentration 9% o.w.f. of dye liquors for example, the ΣK/S values of example 7, 8 and 9 were 14.96, 15.47, 16.58, separately; on the other hand, the ΣK/S value of reactive dyestuff formula (I-1) of comparative example 1 was 13.09. The data indicate the build-up of example 7 to example 9 with different dye compositions in the present invention is more outstanding than that of comparative example 1 within simply 100% reactive dyestuff formula (I-1).

TEST EXAMPLE 4

Build-up Testing by Exhaustion Dyeing

Each dye composition of Comparative example 1 and Example 10–12 were tested by K/S test to evaluate single colour build-up. The detailed description is as the following.

First, five dye liquors were prepared, wherein each 80 ml liquor respectively had a concentration of 1.0%, 2.0%, 4.0%, 6.0% and 9.0% on the weight of the fabric (o.w.f). After that, inorganic neutral salt was added, and then dyeing of the un-mercerized cloths made of pure cotton was started. The un-mercerized cotton cloths were soaked in the dye liquors. At the same time, dyeing of the dyestuffs was started at 60° C. and then the dyestuffs started diffusing to adhere the cloths with the aid of a horizontal shaker, which is followed by adding an alkali agent that made the dyestuffs react with fiber completely to achieve firm adherence. The resulting dyed cloths were water cleaned, soaping off, and tumble-dried to form finished products.

The results of build-up testing by exhaustion dyeing are summarized in table 4 below.

TABLE 4

| Σ K/S value | Concentration of dye liquors (o.w.f) | | | | |
|---|---|---|---|---|---|
| | 1.0% | 2.0% | 4.0% | 6.0% | 9.0% |
| Comparative example 1 | 3.94 | 6.42 | 9.12 | 10.76 | 13.09 |
| example 10 | 4.11 | 6.58 | 10.03 | 12.49 | 14.89 |
| example 11 | 4.71 | 7.25 | 10.84 | 13.28 | 15.13 |
| example 12 | 5.13 | 7.87 | 11.20 | 13.19 | 15.57 |

K/S is "kubelka coefficient"; it gets better build-up when the value of Σ K/S gets higher.

Based on table 4, different dye compositions of example 10 to example 12 showed higher ΣK/S values than that of comparative example 1 within reactive dyestuff of formula (I-1). Take concentration 9% o.w.f. of dye liquors for example, the ΣK/S values of example 10, 11 and 12 were 14.89, 15.13, 15.57, separately; on the contrary, the ΣK/S value of reactive dyestuff formula (I-1) of comparative example 1 was 13.09. The data indicating the build-up of example 10 to example 12 within different dye compositions in the present invention are more outstanding than that of comparative example 1 within simply 100% reactive dyestuff formula (I-1).

The dye compositions of the present invention are suitable for common uses and have excellent properties. They can be used to dye cellulose fibers with various dyeing methods, such as exhaustion dyeing, printed-dyeing, or continuous dyeing that are commonly used in the dyeing of reactive dyestuffs.

The dye compositions of the present invention are water-soluble dyestuffs that have a highly commercial value. The dye compositions of the present invention can obtain dyeing results with excellent properties in all aspects, especially in washing off, build-up, levelness, light fastness, and wet-light fastness.

Although the present invention has been explained in relation to its preferred embodiment, it is to be understood that many other possible modifications and variations can be made without departing from the scope of the invention as hereinafter claimed.

What is claimed is:

1. A dye composition comprising:
(a) a monoazo dye of the formula (I):

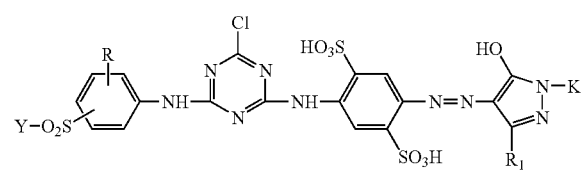

wherein R is hydrogen, sulfo, $C_{1-4}$ alkyl or $C_{1-4}$ alkoxyl; $R_1$ is —$CH_3$ or —COOH; K is phenyl or naphthyl rings having 0 to 3 substituent groups, said substituent groups are selected from the groups consisting of halogen, $C_{1-4}$ alkyl, $C_{1-4}$ alkoxyl, nitro, amino, hydroxyl, carboxyl, phosphonic acid and sulfo group; Y is —CH=$CH_2$, —$CH_2CH_2Cl$ or —$CH_2CH_2OSO_3H$; and (b) a disazo dye of the formula (II):

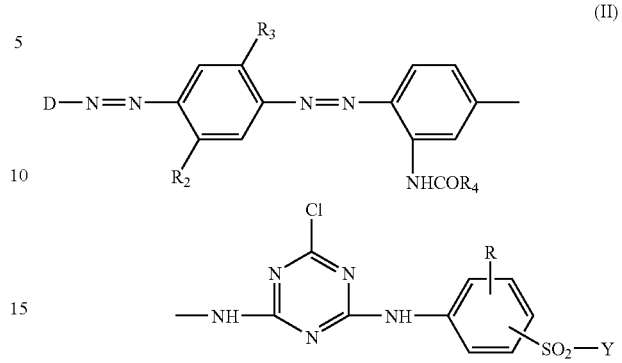

wherein R is hydrogen, sulfo, $C_{1-4}$ alkyl or $C_{1-4}$ alkoxyl; $R_2$ and $R_3$ independently is hydrogen, halogen, $C_{1-4}$ alkyl or $C_{1-4}$ alkoxyl; $R_4$ is $C_{1-4}$ alkyl or —$NH_2$; Y is —CH=$CH_2$, —$CH_2CH_2Cl$, or —$CH_2CH_2OSO_3H$; D is a group having following formulas:

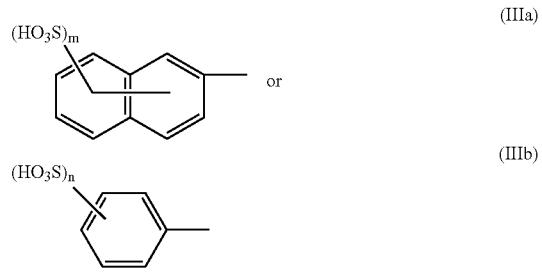

wherein m is an integer of 1, 2 or 3; n is an integer of 1 or 2.

2. A dye composition according to claim 1, wherein said formula (I) is present in an amount ranging from 50% to 99% by weight relative to total weight of said composition, and said formula (II) is present in an amount ranging from 1% to 50% by weight relative to total weight of said composition.

3. A dye composition according to claim 1, wherein said formula (I) is present in an amount ranging from 60% to 90% by weight relative to total weight of said composition, and said formula (II) is present in an amount ranging from 10% to 40% by weight relative to total weight of said composition.

4. A dye composition according to claim 1, wherein said formula (I) is formula (Ia):

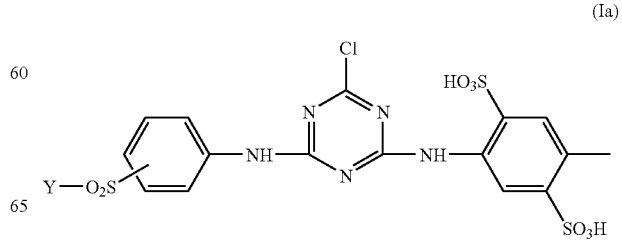

-continued

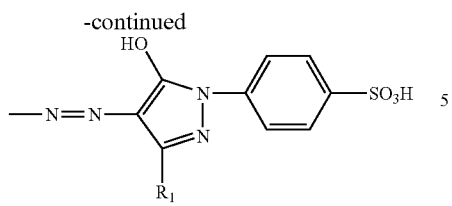

wherein $R_1$ is —$CH_3$ or —COOH; Y is —CH=$CH_2$, —$CH_2CH_2Cl$ or —$CH_2CH_2OSO_3H$.

5. A dye composition according to claim 1, wherein said formula (II) is formula (IIa):

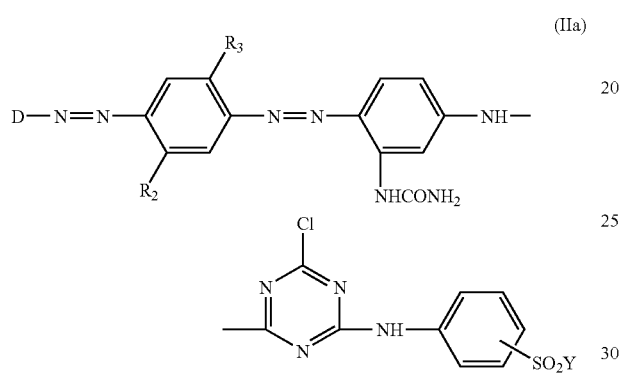
(IIa)

wherein $R_2$ and $R_3$ independently is hydrogen, halogen, $C_{1-4}$ alkyl or $C_{1-4}$ alkoxyl; Y is —CH=$CH_2$, —$CH_2CH_2Cl$, or —$CH_2CH_2OSO_3H$; D is a group having formulas (IIIa) or (IIIb)

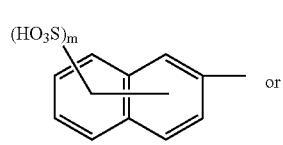
(IIIa)

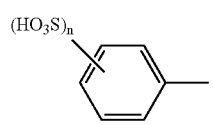
(IIIb)

wherein m is an integer of 1, 2 or 3; n is an integer of 1 or 2.

6. A dye composition according to claim 1, wherein said formula (I) is formula (Ib):

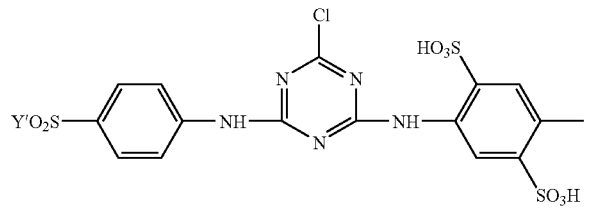
(Ib)

-continued

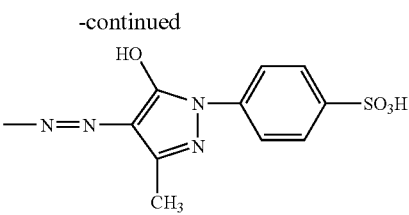

wherein Y' is —CH=$CH_2$ or —$CH_2CH_2OSO_3H$.

7. A dye composition according to claim 1, wherein said formula (II) is formula (IIb):

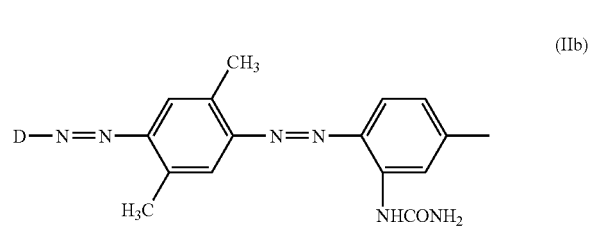
(IIb)

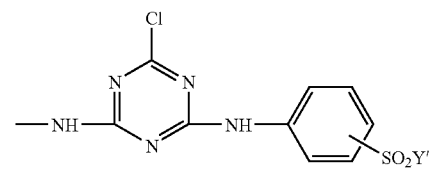

wherein Y' is —CH=$CH_2$ or —$CH_2CH_2OSO_3H$; D is a group having formulas (IIIa) or (IIIb):

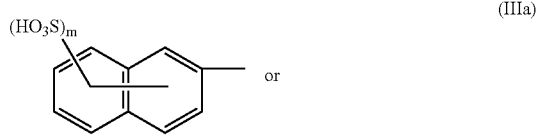
(IIIa)

(IIIb)

wherein m is an integer of 1, 2 or 3; n is an integer of 1 or 2.

8. A dye composition according to claim 6, wherein said formula (Ib) is formula (I-1):

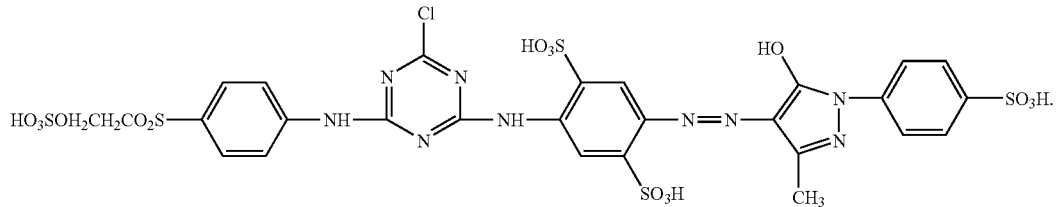
(I-1)

9. A dye composition according to claim 7, wherein said formula (IIb) is formula (II-1):

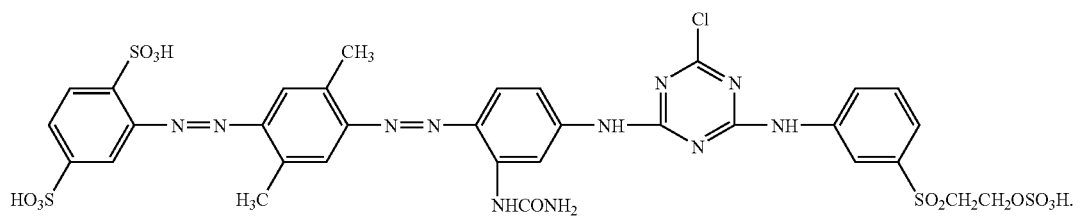
(II-1)

10. A dye composition according to claim 7, wherein said formula (IIb) is formula (II-2):

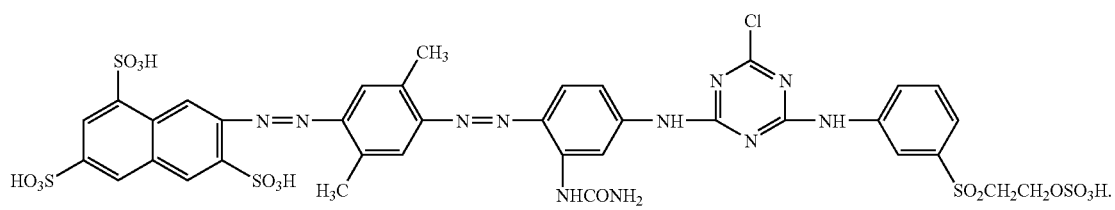
(II-2)

11. A method of dyeing or printing a fiber materials, comprising contacting the fiber materials with a composition having a monoazo dye of the formula (I):

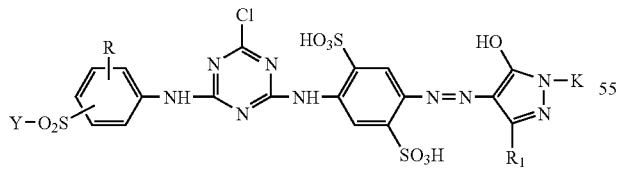
(I)

wherein R is hydrogen, sulfo, $C_{1-4}$ alkyl or $C_{1-4}$ alkoxyl; $R_1$ is —$CH_3$ or —COOH; K is phenyl or naphthyl rings having 0 to 3 substituent groups, said substituent groups are selected from the groups consisting of halogen, $C_{1-4}$ alkyl, $C_{1-4}$ alkoxyl, nitro, amino, hydroxyl, carboxyl, phosphonic acid and sulfo group; Y is —CH=$CH_2$, —$CH_2CH_2Cl$ or —$CH_2CH_2OSO_3H$; and a disazo dye of the formula (II):

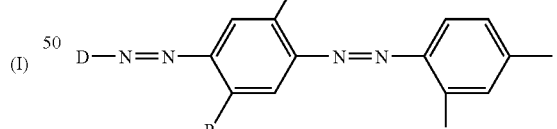
(II)

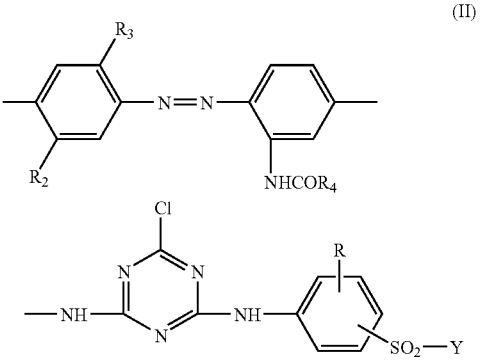

wherein R is hydrogen, sulfo, $C_{1-4}$ alkyl or $C_{1-4}$ alkoxyl; $R_2$ and $R_3$ independently is hydrogen, halogen, $C_{1-4}$ alkyl or $C_{1-4}$ alkoxyl; $R_4$ is $C_{1-4}$ alkyl or —$NH_2$; Y is —CH=$CH_2$, —$CH_2CH_2Cl$, or —$CH_2CH_2OSO_3H$; D is a group having formulas (IIIa) or (IIIb):

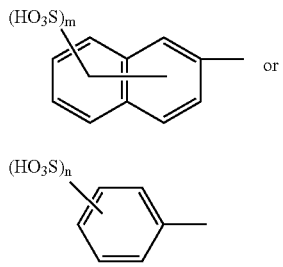

wherein m is an integer of 1, 2 or 3; n is an integer of 1 or 2.

12. A method according to claim 11, wherein said formula (I) is present in an amount ranging from 50% to 99% by weight relative to total weight of said composition, and said formula (II) is present in an amount ranging from 1% to 50% by weight relative to total weight of said composition.

13. A method according to claim 11, wherein said said formula (I) is present in an amount ranging from 60% to 90% by weight relative to total weight of said composition, and said formula (II) is present in an amount ranging from 10% to 40% by weight relative to total weight of said composition.

14. A method according to claim 11, wherein said formula (I) is formula (Ia):

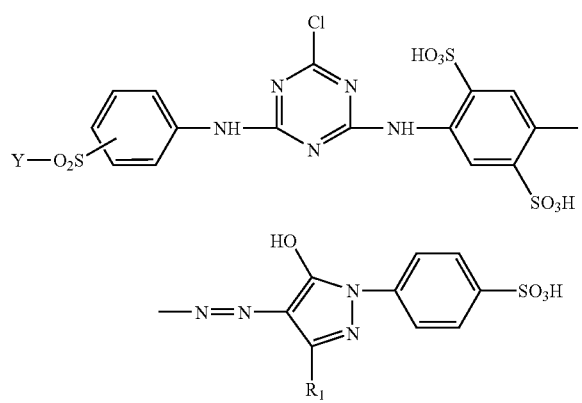

wherein $R_1$ is —$CH_3$ or —COOH; Y is —CH=$CH_2$, —$CH_2CH_2Cl$ or —$CH_2CH_2OSO_3H$.

15. A method according to claim 11, wherein said formula (II) is formula (IIa):

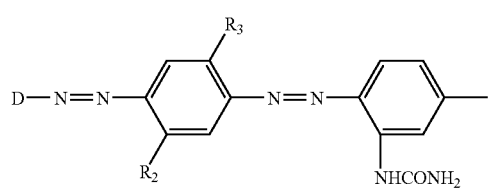

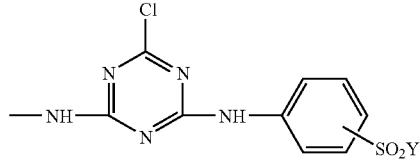

wherein $R_2$ and $R_3$ independently is hydrogen, halogen, $C_{1-4}$ alkyl or $C_{1-4}$ alkoxyl; Y is —CH=$CH_2$, —$CH_2CH_2Cl$, or —$CH_2CH_2OSO_3H$; D is a group having formulas (IIIa) or (IIIb):

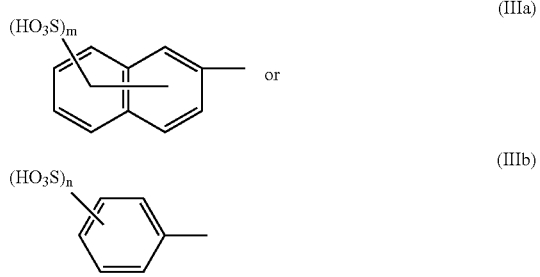

wherein m is an integer of 1, 2 or 3; n is an integer of 1 or 2.

16. A method according to claim 11, wherein said formula (I) is formula (Ib):

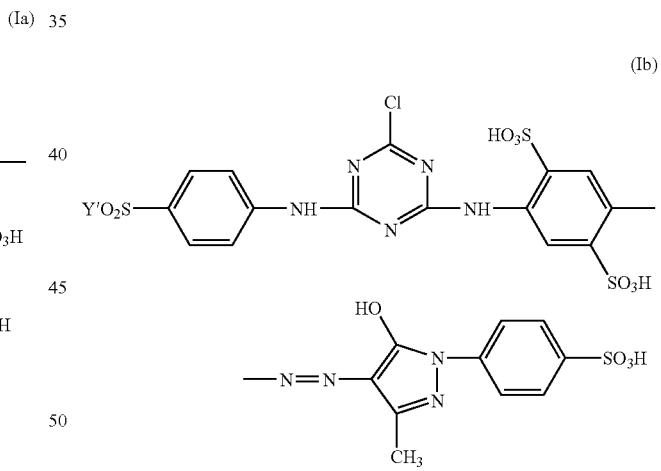

wherein Y' is —CH=$CH_2$ or —$CH_2CH_2OSO_3H$.

17. A method according to claim 11, wherein said formula (II) is formula (IIb):

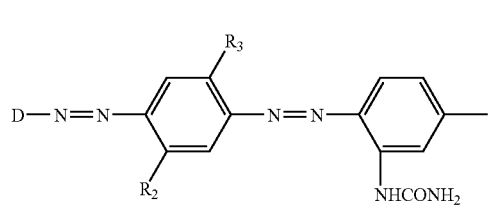

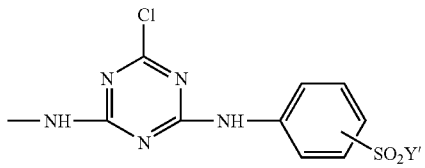
Y' is —CH=CH$_2$ or —CH$_2$CH$_2$OSO$_3$H; D is a group having formulas (IIIa) or (IIIb):
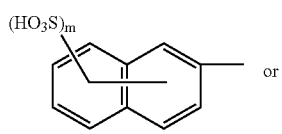
(IIIa)
or
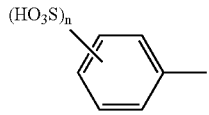
(IIIb)
wherein m is an integer of 1, 2 or 3; n is an integer of 1 or 2.
18. A method according to claim 16, wherein said formula (Ib) is formula (I-1):
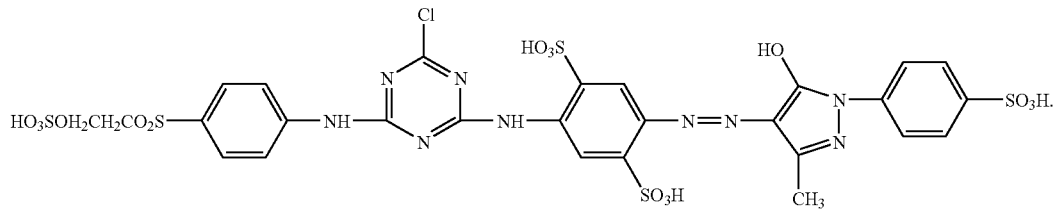
(I-1)
19. A method according to claim 17, wherein said formula (IIb) is formula (II-1):
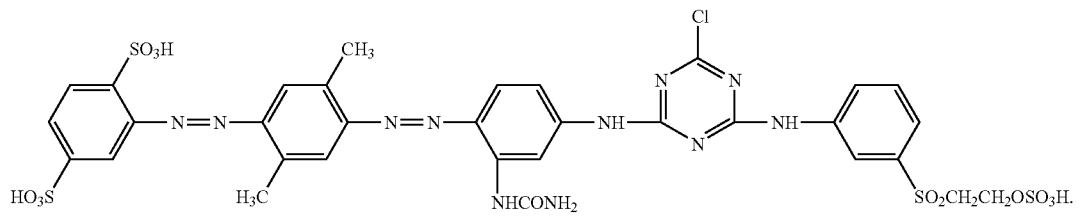
(II-1)

20. A method according to claim 17, wherein said formula (IIb) is formula (II-2):

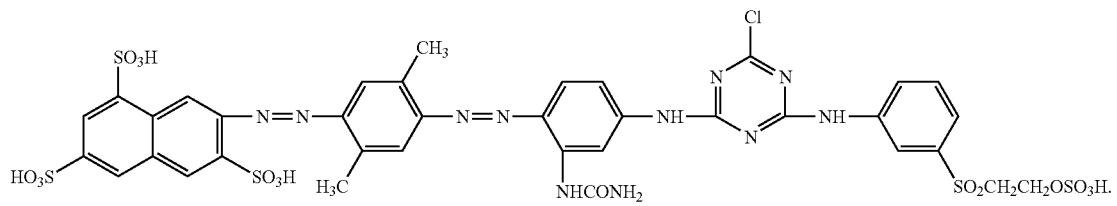

(II-2)

21. A method according to claim 11, wherein said fiber materials are cellulose fibers of cotton, artificial cotton, linen, or artificial linen, or synthetic polyamides of wool, silk, or nylon.

22. A method according to claim 11, wherein said dyeing is performed with exhaustion dyeing, cold batch-up dyeing, textile printing dyeing, or continuous dyeing method.

* * * * *